(12) United States Patent
Murata et al.

(10) Patent No.: US 9,533,585 B2
(45) Date of Patent: Jan. 3, 2017

(54) VEHICLE

(71) Applicant: TOYOTA JIDOSHA KABUSHIKI KAISHA, Toyota-shi, Aichi-ken (JP)

(72) Inventors: Takashi Murata, Kasugai (JP); Yusuke Kuruma, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/838,937

(22) Filed: Aug. 28, 2015

(65) Prior Publication Data

US 2016/0059717 A1 Mar. 3, 2016

(30) Foreign Application Priority Data

Aug. 29, 2014 (JP) .................. 2014-175992

(51) Int. Cl.
*B60L 11/18* (2006.01)
*H01M 10/615* (2014.01)
(Continued)

(52) U.S. Cl.
CPC ........ *B60L 11/1809* (2013.01); *B60L 11/1875* (2013.01); *B60W 20/106* (2013.01);
(Continued)

(58) Field of Classification Search
CPC .............. B60L 11/1809; B60L 11/1875; B60L 2240/545; B60L 2240/662; H01M 10/615; H01M 10/635; B60W 20/106; B20L 2260/56; Y02T 10/7005; Y02T 10/705; Y02T 10/7291; Y02T 90/16; Y10S 903/907
(Continued)

(56) References Cited

U.S. PATENT DOCUMENTS

2012/0268074 A1* 10/2012 Cooley .................. H01G 11/58
320/130
2013/0162027 A1 6/2013 Yamamoto et al.
(Continued)

FOREIGN PATENT DOCUMENTS

FR 2997233 A1 4/2014
JP 2012044813 A 3/2012
(Continued)

*Primary Examiner* — McDieunel Marc
*Assistant Examiner* — James E Stroud
(74) *Attorney, Agent, or Firm* — Sughrue Mion, PLLC

(57) ABSTRACT

A vehicle includes: an electric storage device; a first temperature sensor configured to detect a temperature of the electric storage device; a second temperature sensor configured to detect an environmental temperature; a heater configured to warm the electric storage device; and a controller configured to control the heater. The controller is configured to: when end time of the external charging is set, calculate a remaining time period from current time to the end time; identify a temperature increasing time period that corresponds to the calculated remaining time period, the temperature of the electric storage device, and the environmental temperature by using a corresponding relationship among the remaining time period, the temperature of the electric storage device, the environmental temperature, and the temperature increasing time period; and start driving the heater such that the temperature of the electric storage device at the end time reaches the target temperature.

6 Claims, 11 Drawing Sheets

(51) Int. Cl.
  *H01M 10/635* (2014.01)
  *B60W 20/00* (2016.01)
(52) U.S. Cl.
  CPC ....... *H01M 10/615* (2015.04); *H01M 10/635*
    (2015.04); *B60L 2240/545* (2013.01); *B60L*
    *2240/662* (2013.01); *B60L 2260/56* (2013.01);
    *Y02T 10/7005* (2013.01); *Y02T 10/705*
    (2013.01); *Y02T 10/7291* (2013.01); *Y02T*
    *90/16* (2013.01); *Y10S 903/907* (2013.01)
(58) Field of Classification Search
  USPC .......................................................... 701/22
  See application file for complete search history.

(56) References Cited

U.S. PATENT DOCUMENTS

| | | | |
|---|---|---|---|
| 2013/0190958 A1 | 7/2013 | Izumi | |
| 2013/0234648 A1* | 9/2013 | Kelty | B60L 1/02 320/106 |
| 2013/0297122 A1* | 11/2013 | Gibson | B60W 20/40 701/22 |
| 2014/0288736 A1* | 9/2014 | Martin | F02D 29/02 701/22 |
| 2014/0350764 A1 | 11/2014 | Arai et al. | |
| 2015/0069975 A1* | 3/2015 | Farah | H02J 7/0019 320/150 |
| 2015/0210179 A1* | 7/2015 | Teraya | B60K 6/445 307/10.1 |
| 2015/0229151 A1* | 8/2015 | Sudan | H02J 7/0072 320/137 |
| 2015/0357636 A1* | 12/2015 | Misawa | H01M 4/525 429/213 |

FOREIGN PATENT DOCUMENTS

| | | |
|---|---|---|
| JP | 2013-147170 A | 8/2013 |
| JP | 2014080163 A | 5/2014 |
| WO | 2012/124486 A1 | 9/2012 |
| WO | 2013098990 A1 | 7/2013 |

* cited by examiner

FIG.5

MAP FOR EACH ENVIRONMENTAL TEMPERATURE Tout

| BATTERY TEMPERATURE: TBs | REMAINING TIME PERIOD: t_r |
|---|---|
| | TEMPERATURE INCREASING TIME PERIOD: t_h |

FIG. 10

MAP FOR EACH ENVIRONMENTAL TEMPERATURE Tout

| BATTERY TEMPERATURE: TBs | WAIT TIME PERIOD: t_w |
|---|---|
| | BATTERY TEMPERATURE: TBw |

VEHICLE

INCORPORATION BY REFERENCE

The disclosure of Japanese Patent Application No. 2014-175992 filed on Aug. 29, 2014 including the specification, drawings and abstract is incorporated herein by reference in its entirety.

BACKGROUND OF THE INVENTION

1. Field of the Invention

The invention relates to a vehicle that includes an electric storage device charged with electric power from an external power supply and a heater for warming the electric storage device by receiving the electric power from the external power supply.

2. Description of Related Art

In International Publication No. 2012/124486, a battery heater starts being actuated when a battery temperature is decreased to an actuation start temperature, and the battery heater stops being actuated when the battery temperature is increased to an actuation stop temperature that is higher than the actuation start temperature. In addition, in International Publication No. 2012/124486, the battery heater is actuated when timer charging is conducted.

When timer charging end time is set, a vehicle starts running at this end time or later. Accordingly, it is preferred to secure input/output performance (particularly, output performance) of the battery when the vehicle starts running, in other words, at the timer charging end time. Since the input/output performance of the battery depends on the battery temperature, the battery temperature only needs to reach a specified temperature at the timer charging end time.

In International Publication No. 2012/124486, the battery temperature is maintained at the actuation stop temperature (the specified temperature) or higher by controlling the actuation of the battery heater. Thus, the battery temperature can be the specified temperature or higher at the timer charging end time.

However, in International Publication No. 2012/124486, there is a case where the battery heater is repeatedly actuated during the timer charging. In other words, in the case where the battery heater stops being actuated after the battery temperature is increased to the actuation stop temperature, the battery temperature is decreased by an influence of an outside air temperature. Then, when the battery temperature is decreased to the actuation start temperature, the battery heater starts being actuated again. In this way, the battery heater is repeatedly actuated.

When the battery heater is repeatedly actuated as described above, the electric power associated with the actuation of the battery heater is wasted. In other words, in the case where the battery temperature is decreased after the battery heater stops being actuated, the electric power that is consumed during the actuation of the battery heater before decreasing of the battery temperature is wasted. As described above, the battery temperature only needs to reach the specified temperature at the timer charging end time. Thus, if the battery heater is repeatedly actuated, the electric power associated with the actuation of the battery heater is wasted.

SUMMARY OF THE INVENTION

The invention provides a vehicle that includes an electric storage device charged with electric power from an external power supply and a heater for warming the electric storage device by receiving the electric power from the external power supply.

A vehicle according to a first aspect of the invention includes an electric storage device, a first temperature sensor, a second temperature sensor, a heater, and a controller. The electric storage device is configured to be a power source configured to make the vehicle run and conduct charging (external charging) by using electric power from an external power source located outside of the vehicle. The first temperature sensor is configured to detect a temperature of the electric storage device, and the second temperature sensor is configured to detect an environmental temperature in a peripheral environment of the electric storage device. The heater is configured to warm the electric storage device by receiving the electric power from the external power source to generate heat.

The controller is configured to, when end time of the external charging is set, calculate a remaining time period from current time at a time of this setting to the end time. The controller is configured to identify a time period (a temperature increasing time period) that is required for a temperature increase by driving the heater to increase the temperature of the electric storage device to a target temperature by using a specified corresponding relationship. The specified corresponding relationship is a corresponding relationship among the remaining time period, the temperature of the electric storage device at the current time, the environmental temperature, and the temperature increasing time period.

It is possible by using the specified corresponding relationship to identify the temperature increasing time period that corresponds to the calculated remaining time period, the temperature of the electric storage device at the current time that is detected by the first temperature sensor, and the environmental temperature detected by the second temperature sensor. The specified corresponding relationship can be expressed as a calculating equation or a map. The controller is configured to start driving the heater based on the end time and the temperature increasing time period such that the temperature of the electric storage device at the end time reaches the target temperature.

Meanwhile, a vehicle according to a second aspect of the invention includes an electric storage device, a temperature sensor, a memory, a heater, and a controller. The electric storage device is configured to be a power source configured to make the vehicle run and conduct charging (external charging) by using electric power from an external power source located outside of the vehicle. The temperature sensor is configured to detect a temperature of the electric storage device. The memory is configured to store an environmental temperature in a peripheral environment of the electric storage device. The heater is configured to warm the electric storage device by receiving the electric power from the external power source to generate heat.

The controller is configured to, when end time of the external charging is set, calculate a remaining time period from current time at a time of this setting to the end time. The controller is configured to identify a time period (a temperature increasing time period) that is required for a temperature increase by driving the heater to increase the temperature of the electric storage device to a target temperature by using a specified corresponding relationship. The specified corresponding relationship is a corresponding relationship among the remaining time period, the temperature of the electric storage device at the current time, the environmental temperature, and the temperature increasing time period.

It is possible by using the specified corresponding relationship to identify the temperature increasing time period that corresponds to the calculated remaining time period, the temperature of the electric storage device at the current time that is detected by the temperature sensor, and the environmental temperature stored in the memory. The specified corresponding relationship can be expressed as a calculating equation or a map. The controller is configured to start driving the heater on the basis of the end time and the temperature increasing time period such that the temperature of the electric storage device at the end time reaches the target temperature.

The temperature of the electric storage device can reach the target temperature at the end time by driving the heater only for the temperature increasing time period. At the end time onward, the external charging is finished, and the vehicle starts running. Once the vehicle starts running, the temperature of the electric storage device tends to be increased. Thus, it is possible to suppress the temperature of the electric storage device from being decreased after the heater stops being driven. In the case where the temperature of the electric storage device is decreased after the heater stops being driven, the electric power that is used to drive the heater for increasing the temperature of the electric storage device is wasted. As described above, in the temperature increasing time period, the heater is driven, and the temperature of the electric storage device at the end time reaches the target temperature. In this way, it is possible to suppress the temperature of the electric storage device from being decreased after the heater stops being driven. Thus, it is possible to suppress the electric power associated with the driving of the heater from being wasted.

The environmental temperature stored in the memory can be corrected as will be described below. When the environmental temperature is corrected as such, the environmental temperature after the correction can approximate the actual environmental temperature. Thus, the temperature increasing time period that corresponds to the actual environmental temperature can be identified.

The controller is configured to identify (estimate) the temperature of the electric storage device at a time that the heater starts being driven by using the specified corresponding relationship. The specified corresponding relationship described here is a corresponding relationship among the temperature of the electric storage device at the current time, the temperature of the electric storage device at the time that the heater starts being driven, the environmental temperature, and a time period (a wait time period) from the current time to the time at which the heater starts being driven, and can be expressed as the calculating equation or the map. It is possible by using this corresponding relationship to identify the temperature of the electric storage device at the time that the heater starts being driven that corresponds to the temperature of the electric storage device at the current time that is detected by the temperature sensor, the environmental temperature stored in the memory, and the wait time period that is calculated from the remaining time period and the temperature increasing time period.

The controller is configured to detect the temperature of the electric storage device by using the temperature sensor when starting driving the heater. Then, when the identified (estimated) temperature of the electric storage device is lower than the detected temperature of the electric storage device and a difference between the identified temperature and the detected temperature is larger than a permissible value, the controller can increase the environmental temperature that is stored in the memory by a specified temperature.

When the temperature of the electric storage device (an estimated value) is lower than the temperature of the electric storage device (a detected value), the environmental temperature at a time that the temperature of the electric storage device (the estimated value) is identified is lower than the actual environmental temperature. Accordingly, as described above, the environmental temperature that is stored in the memory is increased by the specified temperature. In this way, the environmental temperature at the time that the temperature of the electric storage device (the estimated value) is identified can approximate the actual environmental temperature.

On the other hand, when the identified (estimated) temperature of the electric storage device is higher than the detected temperature of the electric storage device and the difference between the identified temperature and the detected temperature is larger than the permissible value, the controller can decrease the environmental temperature that is stored in the memory by the specified temperature.

When the temperature of the electric storage device (the estimated value) is higher than the temperature of the electric storage device (the detected value), the environmental temperature at the time that the temperature of the electric storage device (the estimated value) is identified is higher than the actual environmental temperature. Accordingly, as described above, the environmental temperature that is stored in the memory is decreased by the specified temperature. In this way, the environmental temperature at the time that the temperature of the electric storage device (the estimated value) is identified can approximate the actual environmental temperature.

The vehicle according to each of the above aspects can include an engine as a power source configured to make the vehicle run. Here, the vehicle runs in a charge depleting mode when a state of charge of the electric storage device is equal to or higher than a reference value, and runs in a charge sustaining mode when the state of charge is lower than the reference value. In addition, the state of charge at a time that the external charging is finished is equal to or higher than the reference value. The target temperature as described above can be a temperature of the electric storage device at which output of the electric storage device corresponding to a travel in the charge depleting mode is secured.

After the external charging is finished, the state of charge of the electric storage device becomes higher than the reference value. Thus, the vehicle runs in the charge depleting mode. It is possible by setting the target temperature as described above to facilitate charging or discharging of the electric storage device during the travel in the charge depleting mode.

The state of charge represents a charging and discharging rate of the electric storage device. The charge depleting mode is a mode in which the travel only by using the output of the electric storage device is prioritized. The charge sustaining mode is a mode in which the travel by concurrently using the output of the electric storage device and the output of the engine is prioritized.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 shows a corresponding relationship (a map) among a battery temperature, a remaining time period, and a temperature increasing time period at a specified environmental temperature;

FIG. 10 shows a corresponding relationship (a map) among a battery temperature (a detected value), a battery temperature (an estimated value), and a wait time period at a specified environmental temperature.

DETAILED DESCRIPTION OF EMBODIMENTS

A description will hereinafter be made on embodiments of the invention.

Embodiment 1

Figure 1:
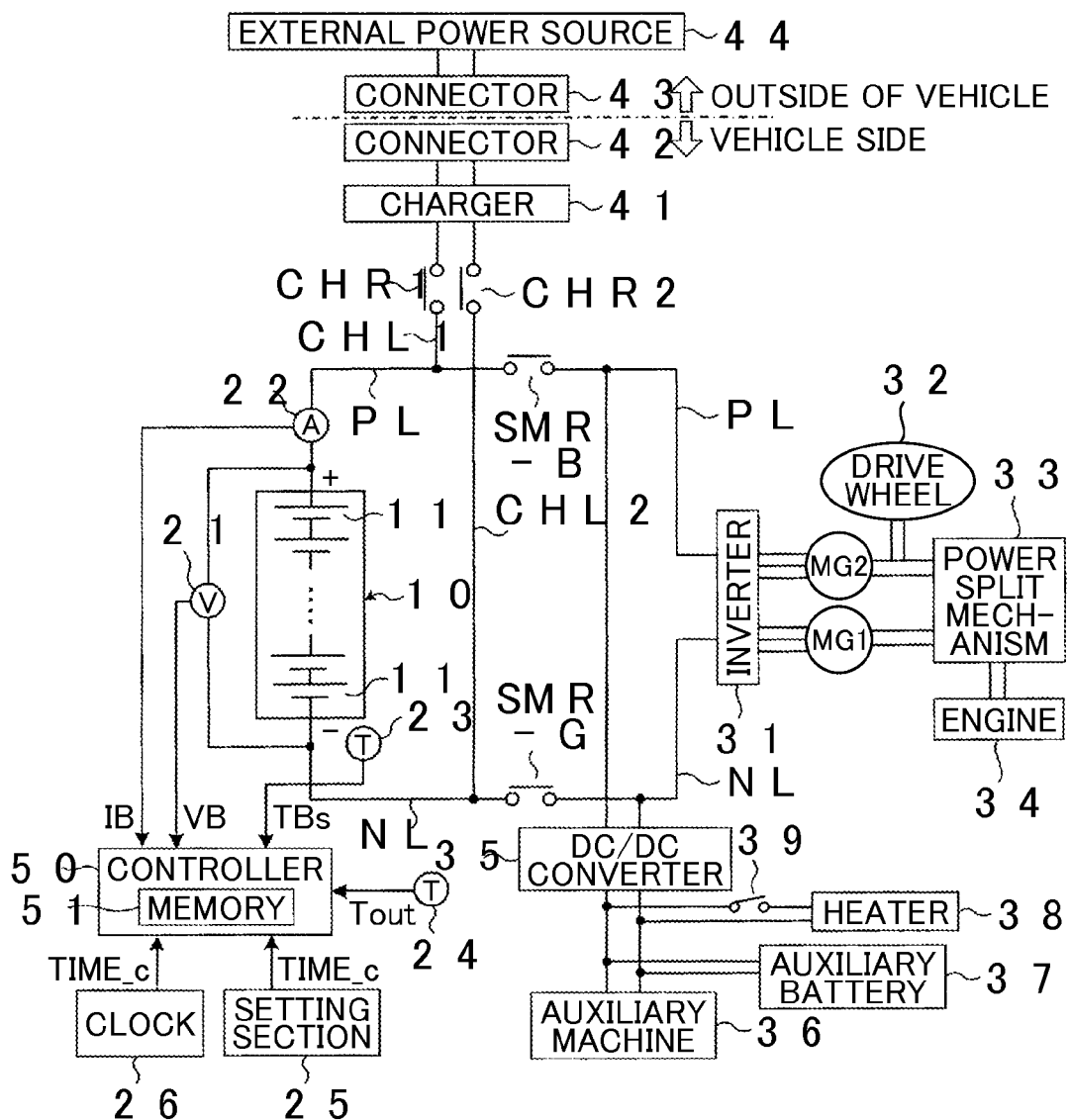
FIG. 1 shows a configuration of a hybrid system.

FIG. 1 shows a configuration of a hybrid system of Embodiment 1 as a first embodiment according to the invention. The hybrid system shown in FIG. 1 is mounted in a vehicle (a so-called hybrid vehicle).

A main battery (corresponding to the electric storage device of the invention) 10 has plural unit cells 11 that are connected in series. As the unit cell 11, a secondary battery, such as a nickel-hydrogen battery or a lithium-ion battery, can be used. In addition, instead of the secondary battery, an electric double-layer capacitor can be used. The main battery 10 may contain the plural unit cells 11 that are connected in parallel.

A voltage sensor 21 detects a voltage value VB of the main battery 10 and outputs a detection result to a controller 50. A current sensor 22 detects a current value IB of the main battery 10 and outputs a detection result to the controller 50. Here, the current value IB at a time that the main battery 10 is discharged is set as a positive value, and the current value IB at a time that the main battery 10 is charged is set as a negative value. A temperature sensor 23 detects a temperature (referred to as a battery temperature) TB s of the main battery 10 and outputs a detection result to the controller 50. Here, the plural temperature sensors 23 may be provided at different positions from each other in the main battery 10.

A positive electrode line PL is connected to a positive electrode terminal of the main battery 10, and a negative electrode line NL is connected to a negative electrode terminal of the main battery 10. The main battery 10 is connected to an inverter 31 via the positive electrode line PL and the negative electrode line NL. A system main relay SMR-B is provided in the positive electrode line PL, and a system main relay SMR-G is provided in the negative electrode line NL. Each of the system main relays SMR-B, SMR-G is switched between On and Off by receiving a control signal from the controller 50.

When a vehicle ignition switch is switched from Off to On, the controller 50 switches each of the system main relays SMR-B, SMR-G from Off to On, and thereby connects the main battery 10 to the inverter 31. In this way, the hybrid system shown in FIG. 1 is brought into an activated state (Ready-On). The vehicle can run when the hybrid system is Ready-On.

On the other hand, when the ignition switch is switched from On to Off, the controller 50 switches each of the system main relays SMR-B, SMR-G from On to Off, and thereby disconnects the main battery 10 from the inverter 31. In this way, the hybrid system shown in FIG. 1 is brought into a stop state (Ready-Off). The vehicle cannot run when the hybrid system is Ready-Off.

The inverter 31 converts DC power output from the main battery 10 to AC power, and outputs the AC power to a motor generator MG2. The motor generator MG2 receives the AC power output from the inverter 31 and generates kinetic energy (power) for running the vehicle. The vehicle can run when the kinetic energy generated by the motor generator MG2 is transmitted to a drive wheel 32.

A power split mechanism 33 transmits power of the engine 34 to the drive wheel 32 or transmits the power of the engine 34 to a motor generator MG1. The motor generator MG1 receives the power of the engine 34 and generates the electric power. The electric power (the AC power) generated by the motor generator MG1 is supplied to the motor generator MG2 or supplied to the main battery 10 via the inverter 31. When the electric power generated by the motor generator MG1 is supplied to the motor generator MG2, the drive wheel 32 can be driven by the kinetic energy generated by the motor generator MG2. Meanwhile, when the electric power generated by the motor generator MG1 is supplied to the main battery 10, the main battery 10 can be charged.

When the vehicle is decelerated or stopped, the motor generator MG2 converts the kinetic energy that is generated during braking of the vehicle into electrical energy (the AC power). The inverter 31 converts the AC power generated by the motor generator MG2 into the DC power, and outputs the DC power to the main battery 10. In this way, the main battery 10 can store regenerative electric power.

In the hybrid system of this example, a booster circuit can be provided in a current path between the main battery 10 and the inverter 31. The booster circuit can raise output voltage of the main battery 10, and can output the electric power, the voltage of which is raised, to the inverter 31. In addition, the booster circuit can decrease output voltage of the inverter 31, and can output the electric power, the voltage of which is decreased, to the main battery 10.

A DC/DC converter 35 is connected to the positive electrode line PL between the system main relay SMR-B and the inverter 31 and to the negative electrode line NL between the system main relay SMR-G and the inverter 31. An auxiliary machine 36, an auxiliary battery 37, and a heater 38 are connected to the DC/DC converter 35. When the hybrid system is Ready-On, the DC/DC converter 35 decreases the output voltage of the main battery 10 and supplies the electric power, the voltage of which is decreased, to the auxiliary machine 36 and the auxiliary battery 37. In this way, the auxiliary machine 36 can be operated, and the auxiliary battery 37 can be charged. An operation of the DC/DC converter 35 is controlled by the controller 50.

The heater 38 is used to warm the main battery 10. A switch 39 is provided in a current path between the DC/DC converter 35 and the heater 38, and the switch 39 is switched between On and Off by receiving a control signal from the controller 50. When the switch 39 is On, specified electric power is supplied to the heater 38 from the DC/DC converter 35, and the heater 38 can thereby generate heat. The heat generated from the heater 38 is transmitted to the main battery 10, and the main battery 10 is thereby warmed.

A charge line CHL1 is connected to the positive electrode line PL between the positive electrode terminal of the main battery 10 and the system main relay SMR-B, and a charge relay CHR1 is provided in the charge line CHL1. A charge line CHL2 is connected to the negative electrode line NL between the negative electrode terminal of the main battery 10 and the system main relay SMR-G, and a charge relay CHR2 is provided in the charge line CHL2. Each of the charge relays CHR1, CHR2 receives a control signal from the controller 50 and is switched between On and Off.

A charger 41 is connected to the charge lines CHL1, CHL2. A connector (a so-called inlet) 42 is connected to the charger 41 via the charge lines CHL1, CHL2. A connector (a so-called charge plug) 43 can be connected to the connector 42. An external power supply (for example, a commercial power supply) 44 is connected to the connector 43. The connector 43 and the external power supply 44 are mounted on the outside of the vehicle.

When the connector 43 is connected to the connector 42, and the charge relays CHR1, CHR2 are On, the charger 41 converts the AC power from the external power supply 44 into the DC power and outputs the DC power. An operation of the charger 41 is controlled by the controller 50. The DC power output from the charger 41 is supplied to the main battery 10, and the main battery 10 can thereby be charged. The charging of the main battery 10 by using the electric power from the external power supply 44 is referred to as external charging. In the case where the external charging is conducted, the main battery 10 is charged until a state of charge (SOC) of the main battery 10 becomes at least equal to a target value SOC_tag. Here, the target value SOC_tag is preset.

When the external charging is conducted, the hybrid system is brought into Ready-On. In this way, the electric power from the charger 41 can be supplied not only to the main battery 10 but also to the DC/DC converter 35. If the switch 39 is turned On here, the DC/DC converter 35 decreases output voltage of the charger 41, and thus can supply the electric power, the voltage of which is decreased, (constant electric power) to the heater 38. In this way, when the external charging is conducted, the heater 38 can be driven by using some of the electric power from the external power supply 44 and can thereby warm the main battery 10.

It should be noted that the charge line CHL1 can also be connected to the positive electrode line PL between the system main relay SMR-B and the inverter 31. The charge line CHL2 can also be connected to the negative electrode line NL between the system main relay SMR-G and the inverter 31. In this configuration, when the external charging is conducted, the charge relays CHR1, CHR2 need to be turned On, and the hybrid system needs to be Ready-On.

A temperature sensor 24 detects an environmental temperature Tout and outputs a detection result to the controller 50. The environmental temperature Tout is a temperature of the surrounding environment of the main battery 10. For example, a vehicle outside air temperature can be set as the environmental temperature Tout, and an outside air temperature sensor mounted in the vehicle can be used as the temperature sensor 24.

A setting section 25 is used to set time at which the external charging is finished (referred to as charging end time) TIME_e. Information on the charging end time TIME_e, which is set in the setting section 25, is input to the controller 50. When the charging end time TIME_e is set, the external charging is started such that the external charging is finished by the charging end time TIME_e.

A clock 26 is used to measure current time TIME_c. Information on the current time TIME_c, which is measured by the clock 26, is input to the controller 50. The controller 50 has a memory 51, and the memory 51 stores specified information. It should be noted that the memory 51 can be provided not only on the inside of the controller 50 but also on the outside of the controller 50.

It should be noted that the description is made on the hybrid vehicle in this embodiment; however, the invention can also be applied to a so-called electric vehicle. The electric vehicle only includes the main battery 10 as a power source for running the vehicle. For example, in a system mounted in the electric vehicle, the power split mechanism 33, the engine 34, and the motor generator MG1 are removed from the configuration shown in FIG. 1.

Figure 2:
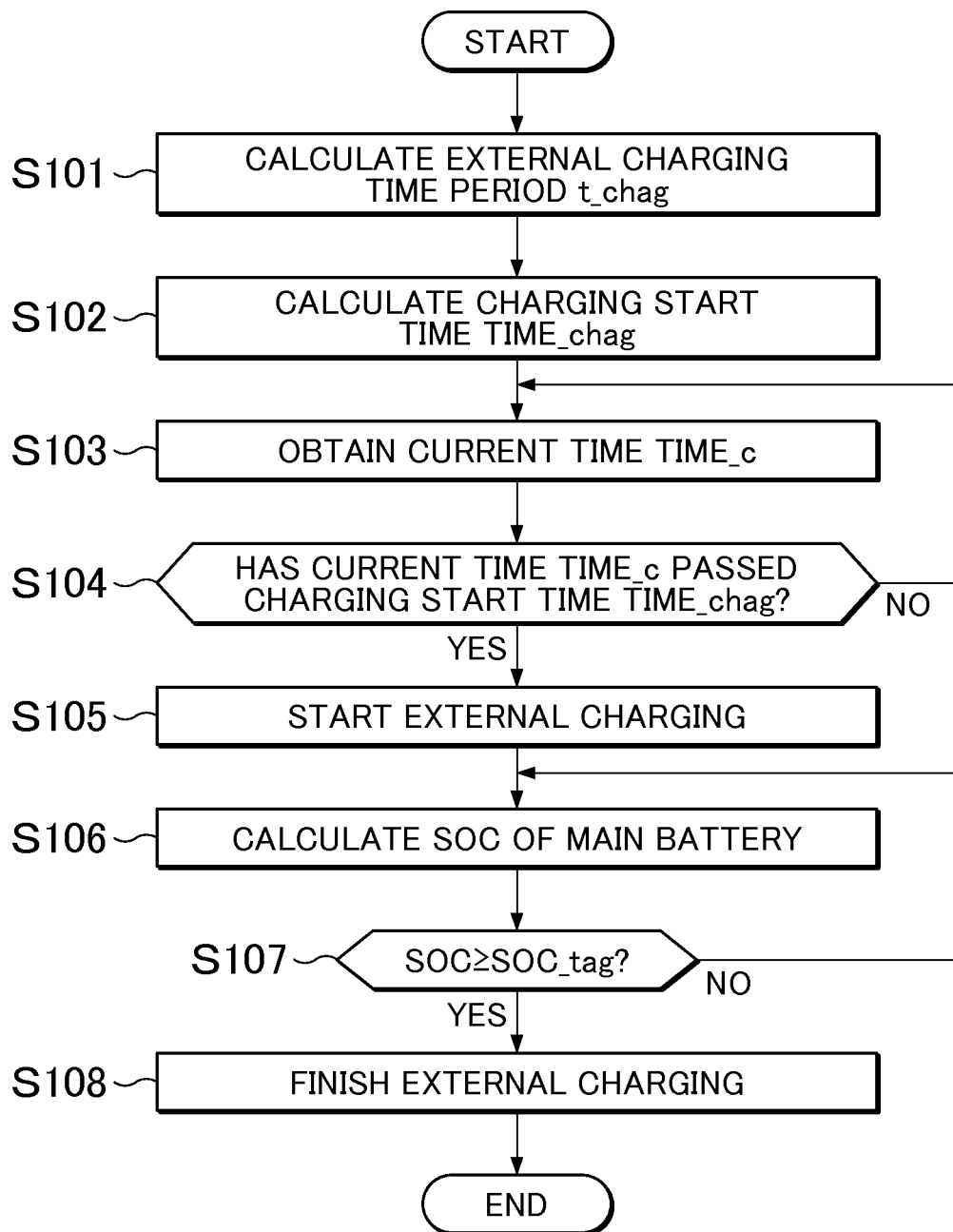
FIG. 2 is a flowchart of processing of external charging when charging end time is set.

Next, a description will be made on processing for conducting the external charging by using a flowchart shown in FIG. 2. The processing shown in FIG. 2 is executed by the controller 50. In addition, the processing shown in FIG. 2 is started when the connector 43 is connected to the connector 42 and the charging end time TIME_e is set in the setting section 25.

In step S101, the controller 50 calculates an external charging time period t_chag. The external charging time period t_chag is a time period from a start of the external charging to an end thereof. The external charging time period t_chag can be calculated on the basis of the current SOC of the main battery 10, the target value SOC_tag, and the current value during the external charging. More specifically, the external charging time period t_chag can be calculated by dividing a difference between the current SOC and the target value SOC_tag by the current value during the external charging.

Here, the target value SOC_tag is preset. In addition, in the external charging, charging is conducted at a constant current, and this current value is preset. Accordingly, the external charging time period t_chag can be calculated by calculating the current SOC of the main battery 10. While the vehicle is running, the SOC of the main battery 10 is calculated as will be described below. Thus, as the SOC of the main battery 10 that is used to calculate the external charging time period t_chag, the SOC of the main battery 10 at a time that the vehicle stops running can be used. It should be noted that the SOC of the main battery 10 may be calculated when the external charging time period t_chag is calculated.

In step S102, the controller 50 calculates charging start time TIME_chag. The charging start time TIME_chag is time at which the external charging is started, and is calculated on the basis of the charging end time TIME_e and the external charging time period t_chag. More specifically, the charging start time TIME_chag is time prior to the charging end time TIME_e by the external charging time period t_chag. If the external charging is started at the charging start time TIME_chag, the external charging can be finished by the charging end time TIME_e.

In step S103, the controller 50 uses the clock 26 to obtain the current time TIME_c. In step S104, the controller 50 determines whether the current time TIME_c, which is obtained in the processing in step S103, has passed the charging start time TIME_chag, which is calculated in the processing in step S102. When the current time TIME_c does not pass the charging start time TIME_chag, the controller 50 returns the processing to step S103.

When the current time TIME_c passes the charging start time TIME_chag, the controller 50 starts the external charging in step S105. More specifically, the controller 50 starts operating the charger 41 in a state that the charge relays CHR1, CHR2 are On. In this way, the electric power is supplied from the charger 41 to the main battery 10.

In step S106, the controller 50 calculates the SOC of the main battery 10. In step S107, the controller 50 determines whether the SOC calculated in the processing in step S106 is at least equal to the target value SOC_tag. If the SOC of the main battery 10 is lower than the target value SOC_tag, the controller 50 returns the processing to step S106, and thereby the external charging is continued. On the other hand, if the SOC of the main battery 10 is at least equal to the target value SOC_tag, the controller 50 finishes the external charging in step S108. More specifically, the controller 50 stops operating the charger 41.

It should be noted that, in the case where the charging end time TIME_e is not set, the external charging is started when the connector 43 is connected to the connector 42 and a user instructs the start of the external charging. In other words, when the connector 43 is connected to the connector 42 and the instruction to start the external charging is received by the controller 50, the processing in step S105 to step S108 shown in FIG. 2 is executed.

The vehicle of this embodiment has known charge-depleting (CD) mode and a charge-sustaining (CS) mode as travel modes. In the CD mode, a travel only by using the output of the main battery 10, that is, a travel only by using the power of the motor generator MG2 is prioritized. In the CS mode, a travel by concurrently using the output of the main battery 10 and the output of the engine 34 is prioritized.

In the CD mode and the CS mode, a state that the vehicle runs only by using the power of the motor generator MG2 and a state that the vehicle runs by concurrently using the power of the engine 34 and the power of the motor generator MG2 are present. Here, requested power (referred to as an engine start power) for starting the engine 34 differs between the CD mode and the CS mode. More specifically, the engine start power in the CD mode is higher than the engine start power in the CS mode. The engine start power in each of the CD mode and the CS mode can be preset. The engine start power is defined by a speed and torque of the engine 34.

When the power requested for the vehicle by an accelerator pedal operation or the like is lower than the engine start power in the CD mode, the vehicle runs only by using the power of the motor generator MG2 in a state that the engine 34 is stopped. On the other hand, when the power requested for the vehicle is at least equal to the engine start power in the CD mode, the vehicle runs by concurrently using the power of the engine 34 and the power of the motor generator MG2.

It should be noted that the power requested for the vehicle only becomes at least equal to the engine start power in the CD mode in a limited travel state such as wide open throttle (WOT). Accordingly, the travel only by using the power of the motor generator MG2 is prioritized in the CD mode.

When the power requested for the vehicle is lower than the engine start power in the CS mode, the vehicle runs only by using the power of the motor generator MG2 in the state that the engine 34 is stopped. On the other hand, when the power requested for the vehicle is at least equal to the engine start power in the CS mode, the vehicle runs by concurrently using the power of the engine 34 and the power of the motor generator MG2.

It should be noted that the power requested for the vehicle only becomes lower than the engine start power in the CS mode in a limited travel state such as an idling travel. Accordingly, the travel by concurrently using the power of the engine 34 and the power of the motor generator MG2 is prioritized in the CS mode.

Figure 3:
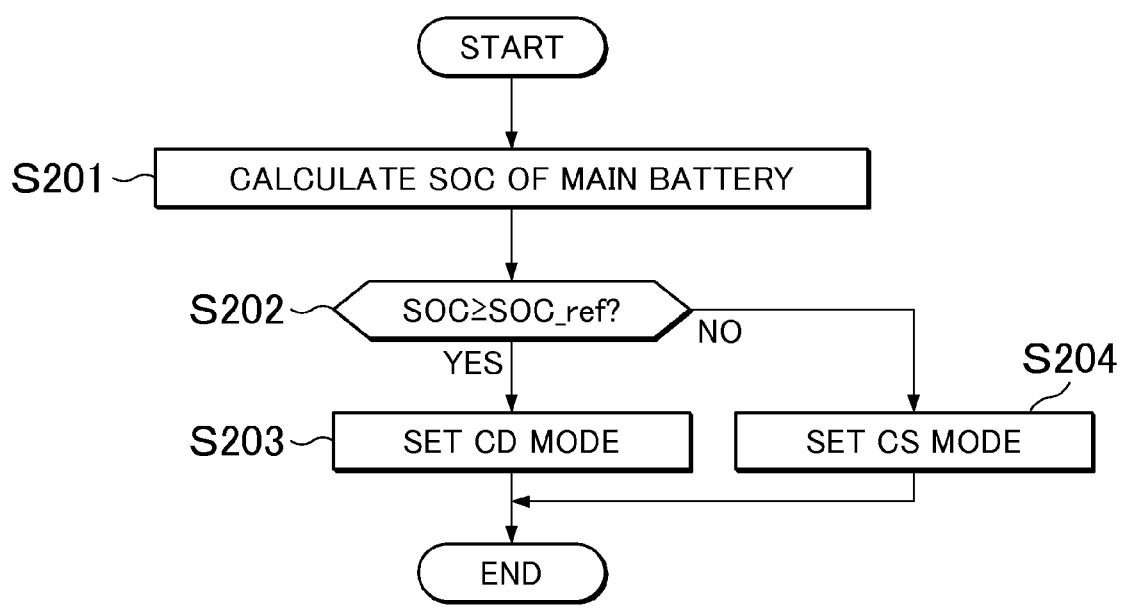
FIG. 3 is a flowchart of processing for setting a travel mode of a vehicle.

A description will be made on processing for setting the vehicle travel mode by using a flowchart shown in FIG. 3. The processing shown in FIG. 3 is executed by the controller 50 at specified time intervals.

In step S201, the controller 50 calculates the SOC of the main battery 10. As it has been known, the SOC of the main battery 10 can be calculated on the basis of the voltage value VB and the current value IB. In step S202, the controller 50 determines whether the SOC calculated in the processing in step S201 is at least equal to a reference value SOC_ref. The reference value SOC_ref is preset, and information on the reference value SOC_ref is stored in the memory 51.

In step S202, if the SOC of the main battery 10 is at least equal to the reference value SOC_ref, the controller 50 sets the CD mode as the vehicle travel mode in step S203. On the other hand, if the SOC of the main battery 10 is lower than the reference value SOC_ref, the controller 50 sets the CS mode as the vehicle travel mode in step S204.

In the case where the external charging is conducted here, the main battery 10 is charged until the SOC thereof becomes higher than the reference value SOC_ref. In other word, the target value SOC_tag during the external charging is set as the higher SOC than the reference value SOC_ref. Thus, the CD mode is set for the vehicle travel immediately after the external charging is conducted. The SOC of the main battery 10 is decreased in conjunction with the travel in the CD mode. Accordingly, when the SOC of the main battery 10 becomes lower than the reference value SOC_ref, the vehicle travel mode is switched from the CD mode to the CS mode.

Figure 4:
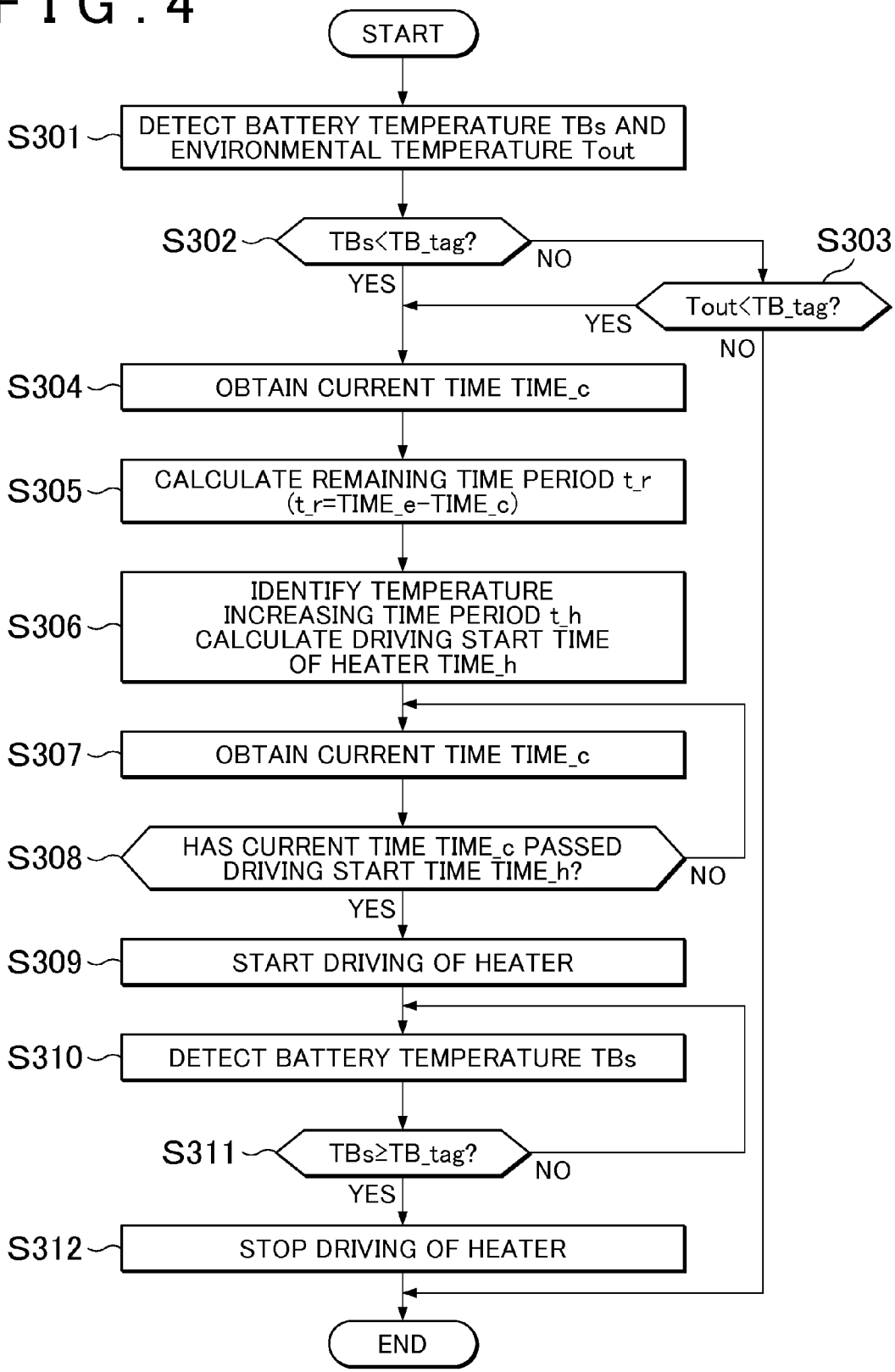
FIG. 4 is a flowchart of processing for controlling driving of a heater in Embodiment 1.

Next, a description will be made on processing for controlling driving of the heater 38 by using a flowchart shown in FIG. 4. The processing shown in FIG. 4 is executed by the controller 50. When the connector 43 is connected to the connector 42 and the charging end time TIME_e is set in the setting section 25, the processing shown in FIG. 4 is started.

In step S301, the controller 50 detects the battery temperature TBs by using the temperature sensor 23, and also detects the environmental temperature Tout by using the temperature sensor 24. In step S302, the controller 50 determines whether the battery temperature TBs detected in the processing in step S301 is lower than a target temperature TB_tag.

The target temperature TB_tag is preset, and information on the target temperature TB_tag can be stored in the memory 51. The target temperature TB_tag can be set in consideration of points, which will be described below.

In the case where the charging end time TIME_e is set and the external charging is conducted until the charging end time TIME_e, the vehicle runs in the CD mode at the charging end time TIME_e onward. In the travel in the CD mode, the travel only by using the output of the main battery 10 is prioritized. Thus, it is preferred to secure input/output performance (particularly, output performance) of the main battery 10 at the charging end time TIME_e onward.

The input/output performance of the main battery 10 depends on the battery temperature TBs, and the input/output performance of the main battery 10 tends to be degraded as the battery temperature TBs is decreased. Accordingly, the target temperature TB_tag can be set as the battery temperature TBs at which the input/output performance of the main battery 10 can be secured. More specifically, a correspondence relationship between the input/output performance of the main battery 10 and the battery temperature TBs is considered, and the battery temperature TBs, at which the input/output performance (particularly, the output performance) corresponding to the travel in the CD mode is obtained, can be set as the target temperature TB_tag.

Here, a lower limit value of the battery temperature TBs, at which the input/output performance (particularly, the output performance) corresponding to the travel in the CD mode is obtained, is identified. Then, the arbitrary battery temperature TBs that is at least equal to this lower limit value can be set as the target temperature TB_tag. The output performance corresponding to the travel in the CD mode is the output performance of the main battery 10 with which the vehicle can run only by using the output of the main battery 10 when the power requested for the vehicle is lower than the engine start power in the CD mode.

Here, in the case where the plural temperature sensors 23 are provided, the battery temperatures TBs detected by the plural temperature sensors 23 may differ from each other in the processing in step S301. At this time, it can be determined in the processing in step S302 whether the lowest battery temperature TBs is lower than the target temperature TB_tag. As it will be described below, in order to increase the battery temperatures TBs of the entire main battery 10 to be at least equal to the target temperature TB_tag by driving the heater 38, it is only necessary in the processing in step S302 to determine whether the lowest battery temperature TBs is lower than the target temperature TB_tag.

In step S302, if the battery temperature TBs is lower than the target temperature TB_tag, the controller 50 determines that it is necessary to drive the heater 38, and executes the processing in step S304 onward. On the other hand, if the battery temperature TBs is at least equal to the target temperature TB_tag, the controller 50 determines whether the environmental temperature Tout detected in the processing in step S301 is lower than the target temperature TB_tag in step S303.

In step S303, if the environmental temperature Tout is at least equal to the target temperature TB_tag, the controller 50 determines that it is not necessary to drive the heater 38, and finishes the processing shown in FIG. 4. On the other hand, if the environmental temperature Tout is lower than the target temperature TB_tag, the controller 50 determines that it is necessary to drive the heater 38, and executes the processing in step S304 onward.

Even in the case where the battery temperature TBs is at least equal to the target temperature TB_tag, if the environmental temperature Tout is lower than the target temperature TB_tag, the battery temperature TBs becomes lower than the target temperature TB_tag by an influence of the environmental temperature Tout in a period from a time at which the charging end time TIME_e is set to the charging end time TIME_e. Thus, in this embodiment, the heater 38 is driven when the environmental temperature Tout is lower than the target temperature TB_tag.

In step S304, the controller 50 uses the clock 26 to obtain the current time TIME_c. Accordingly, the battery temperature TBs and the environmental temperature Tout, both of which is detected in the processing in step S301, are set as the battery temperature TBs and the environmental temperature Tout at the current time TIME_c. In step S305, the controller 50 calculates a remaining time period t_r from the current time TIME_c to the charging end time TIME_e.

In step S306, the controller 50 identifies a temperature increasing time period t_h. The temperature increasing time period t_h is a time period that is required for a temperature increase by driving the heater 38 and increasing the battery temperature TBs to the target temperature TB_tag.

Here, when driving of the heater 38 is not stopped but the heater 38 is continuously driven, the temperature increasing time period t_h corresponds to a time period from a time at which the heater 38 starts being driven to a time at which the heater 38 stops being driven. On the other hand, when the driving of the heater 38 is temporarily paused during the driving of the heater 38, the temperature increasing time period t_h can include not only a time period in which the heater 38 is driven but also a time period in which the driving of the heater 38 is paused. It should be noted that, if the time period for pausing the driving of the heater 38 is short, the time period in which the heater 38 is driven can only be set as the temperature increasing time period t_h.

A case where the driving of the heater 38 is temporarily paused includes, for example, a case where open circuit voltage (OCV) of the auxiliary battery 37 is measured. The auxiliary battery 37 and the heater 38 are connected to the DC/DC converter 35. Accordingly, when the heater 38 is driven, the auxiliary battery 37 is energized, and thus the OCV of the auxiliary battery 37 cannot be measured. For this reason, there is a case where the OCV of the auxiliary battery 37 is measured by temporarily pausing the driving of the heater 38.

The temperature increasing time period t_h depends on the battery temperature TBs and the environmental temperature Tout at the current time TIME_c, the target temperature TB_tag, and the remaining time period t_r. Thus, a corresponding relationship among the temperature increasing time period t_h, the battery temperature TBs and the environmental temperature Tout at the current time TIME_c, the target temperature TB_tag, and the remaining time period t_r can be computed in advance. Here, since the target temperature TB_tag is a preset fixed value, a corresponding relationship among the temperature increasing time period t_h, the battery temperature TBs and the environmental temperature Tout at the current time TIME_c, and the remaining time period t_r may be computed in advance.

This corresponding relationship can be expressed by a calculating equation or a map, and information on this corresponding relationship can be stored in the memory 51. When this corresponding relationship is expressed by the calculating equation, the calculating equation shown in the following equation (1) can be used.

$$t\_h = -\frac{1}{c}\ln\left\{\frac{(TBs - Tout)e^{-c \cdot t\_r(Tout+\beta)}}{\beta}\right\} \quad (1)$$

In the above equation (1), c and β are constants that are defined in advance. Each of the constants c and β are set in consideration of the target temperature TB_tag, a heat dissipation characteristic of the main battery 10 at a time that the battery temperature TBs is decreased by the influence of the environmental temperature Tout, a heat receiving characteristic of the main battery 10 at a time that the battery temperature TBs is increased by the driving of the heater 38, and the like. In addition, as described above, in the case where the driving of the heater 38 is temporarily paused, the constants c and β can be set in consideration of a time period in which the driving of the heater 38 is paused. Information on the constants c and β can be stored in the memory 51.

As the battery temperature TBs shown in the above equation (1), the battery temperature TBs that is detected in the processing in step S301 can be used. Since the environmental temperature Tout is unlikely to be changed in a period from the time at which the charging end time TIME_e is set to the charging end time TIME_e, the environmental temperature Tout can be considered to be constant. Thus, in this embodiment, the environmental temperature Tout detected in the processing in step S301 is used as the environmental temperature Tout shown in the above equation (1). As a time period t_r shown in the above equation (1), the remaining time period t_r that is calculated in the processing in step S305 can be used. In this way, the temperature increasing time period t_h can be identified (calculated) on the basis of the above equation (1).

Meanwhile, when the above-described corresponding relationship is expressed by the map, the temperature increasing time period t_h that corresponds to the battery temperature TBs and the environmental temperature Tout detected in the processing in step S301 and the remaining time period t_r calculated in the processing in step S305 can be identified by using this map. For example, a map shown in FIG. 5 is prepared for the each environmental temperature Tout. The map shown in FIG. 5 indicates the corresponding relationship among the battery temperature TBs, the remaining time period t_r, and the temperature increasing time period t_h.

Since the map shown in FIG. 5 is prepared for the each environmental temperature Tout, the map shown in FIG. 5 that corresponds to the environmental temperature Tout detected in the processing in step S301 can be identified. Next, by using this identified map, the temperature increasing time period t_h that corresponds to the battery temperature TBs detected in the processing in step S301 and the remaining time period t_r calculated in the processing in step S305 can be identified.

Here, in the case where the plural temperature sensors 23 are provided, the battery temperatures TBs detected by the plural temperature sensors 23 may differ from each other in the processing in step S301. At this time, the lowest battery temperature TBs can be set as the battery temperature TBs that is used to identify the temperature increasing time period t_h. In order to increase the battery temperatures TBs of the entire main battery 10 to be at least equal to the target temperature TB_tag by driving the heater 38, the lowest battery temperature TBs only needs to be considered to identify the temperature increasing time period t_h.

In step S306, the controller 50 also calculates driving start time TIME_h. As described above, when the temperature increasing time period t_h is identified, the driving start time TIME_h can be calculated. The driving start time TIME_h is time at which the heater 38 starts being driven, and is time prior to the charging end time TIME_e by the temperature increasing time period t_h.

In step S307, the controller 50 uses the clock 26 to obtain the current time TIME_c. In step S308, the controller 50 determines whether the current time TIME_c, which is obtained in the processing in step S307, has passed the driving start time TIME_h, which is calculated in the processing in step S306. When the current time TIME_c does not pass the driving start time TIME_h, the controller 50 returns the processing to step S307.

On the other hand, when the current time TIME_c passes the driving start time TIME_h, the controller 50 starts driving the heater 38 in step S309. Here, actual time at which the heater 38 starts being driven may match the driving start time TIME_h or may deviate from the driving start time TIME_h. For example, there is a case where the actual time at which the heater 38 starts being driven deviates from the driving start time TIME_h due to a time period that is required to start driving the heater 38 or the like.

In step S310, the controller 50 uses the temperature sensor 23 to detect the battery temperature TBs. In step S311, the controller 50 determines whether the battery temperature TBs detected in the processing in step S310 is at least equal to the target temperature TB_tag. Here, in the case where the plural temperature sensors 23 are provided, the battery temperatures TBs detected by the plural temperature sensors 23 may differ from each other in the processing in step S310. At this time, it can be determined in the processing in step S311 whether the lowest battery temperature TBs is at least equal to the target temperature TB_tag.

In step S311, if the battery temperature TBs is lower than the target temperature TB_tag, the controller 50 returns the processing to step S310. On the other hand, if the battery temperature TBs is at least equal to the target temperature TB_tag, the controller 50 stops driving the heater 38 in step S312.

Figure 6:
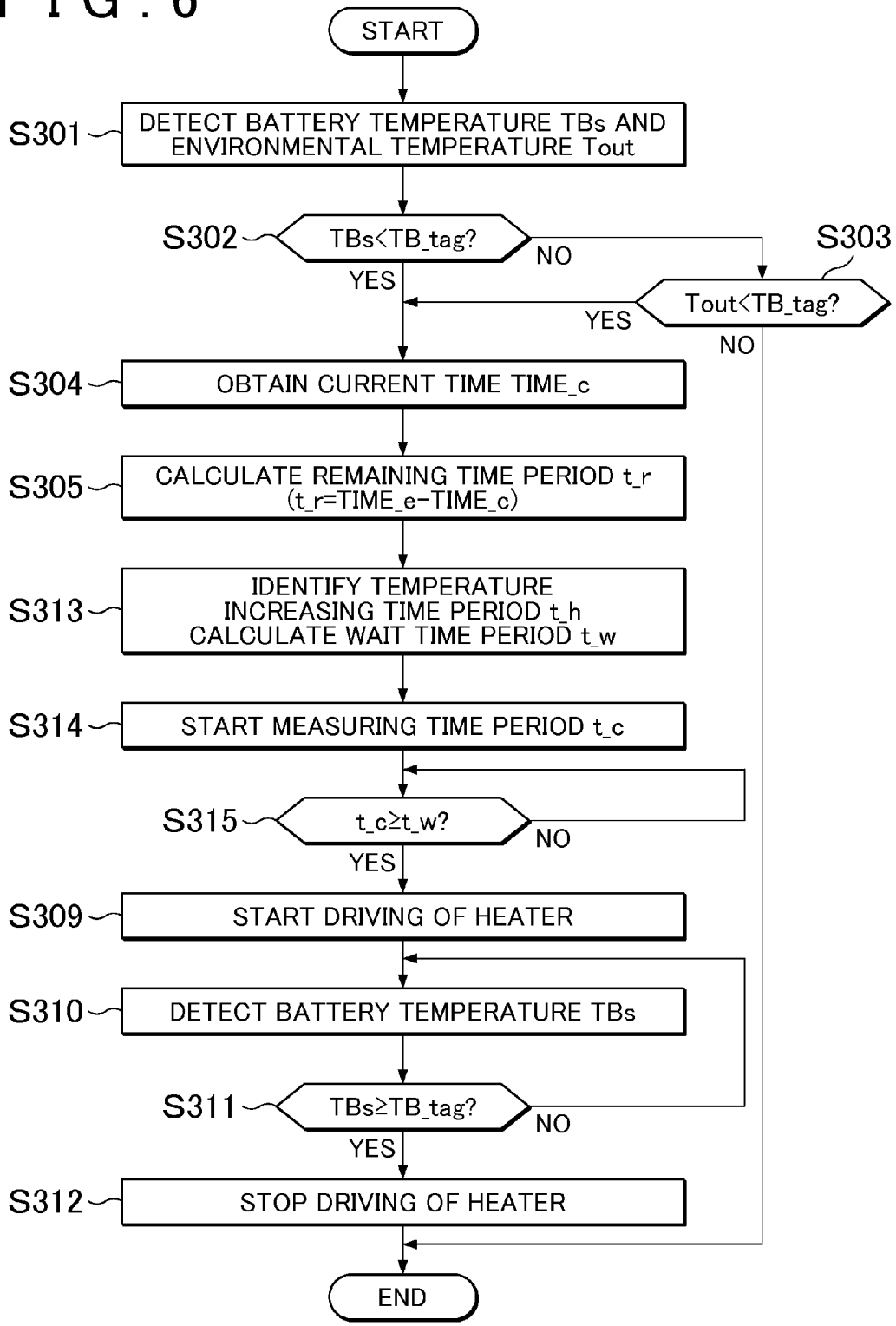
FIG. 6 is a flowchart of processing for controlling the driving of the heater in a modification of Embodiment 1.

It should be noted that the driving start time TIME_h is calculated, and the heater 38 starts being driven if the current time TIME_c is the driving start time TIME_h in the processing shown in FIG. 4. However, the invention is not limited thereto. More specifically, instead of the processing shown in FIG. 4, processing shown in FIG. 6 can be executed. In FIG. 6, the same processing as the processing that has been described in FIG. 4 is denoted by the same reference numeral, and a detailed description thereof will not be made. Hereinafter, a description will mainly be made on processing in FIG. 6 that differs from the processing shown in FIG. 4.

After the processing in step S305, the controller 50 identifies the temperature increasing time period t_h and calculates a wait time period t_w in step S313. Here, the temperature increasing time period t_h can be identified by the same method as used in the processing in step S306 shown in FIG. 4. The wait time period t_w is a time period from the current time TIME_c to the driving start time TIME_h, which is obtained in the processing in step S304. In other words, the wait time period t_w is a time period from the current time TIME_c, at which the charging end time TIME_e is set, to a time at which the heater 38 starts being driven. The wait time period t_w can be calculated by subtracting the temperature increasing time period t_h from the remaining time period t_r, which is calculated in the processing in step S305.

After the processing in step S313, the controller 50 starts measuring a time period t_c in step S314. A timer can be used to measure the time period t_c. In step S315, the controller 50 determines whether the measured time period t_c is at least equal to the wait time period t_w, which is calculated in the processing in step S313.

If the measured time period t_c is shorter than the wait time period t_w in step S315, the controller 50 waits until the measured time period t_c becomes at least equal to the wait time period t_w. If the measured time period t_c is at least equal to the wait time period t_w, the controller 50 executes processing in step S309 onward. The processing in step S315 is substantially the same as the processing in step S308 shown in FIG. 4. In other words, the heater 38 can start being driven at the driving start time TIME_h. Here, the actual time at which the heater 38 starts being driven may match the driving start time TIME_h or may deviate from the driving start time TIME_h. For example, the actual time at which the heater 38 starts being driven may deviate from the driving start time TIME_h, depending on temporal resolution of the timer that is used to measure the time period t_c.

Meanwhile, the processing in steps S302 and S303 is executed in the processing shown in FIG. 4 or FIG. 6. However, the invention is not limited thereto. More specifically, either the processing in step S302 or the processing in step S303 may only be executed. In the case where only the processing in step S302 is executed, the processing shown in FIG. 4 or FIG. 6 can be finished if the battery temperature TBs is at least equal to the target temperature TB_tag. On the other hand, in the case where only the processing in step S303 is executed, the processing in step S303 is executed after the processing in step S301 is executed.

Figure 7:
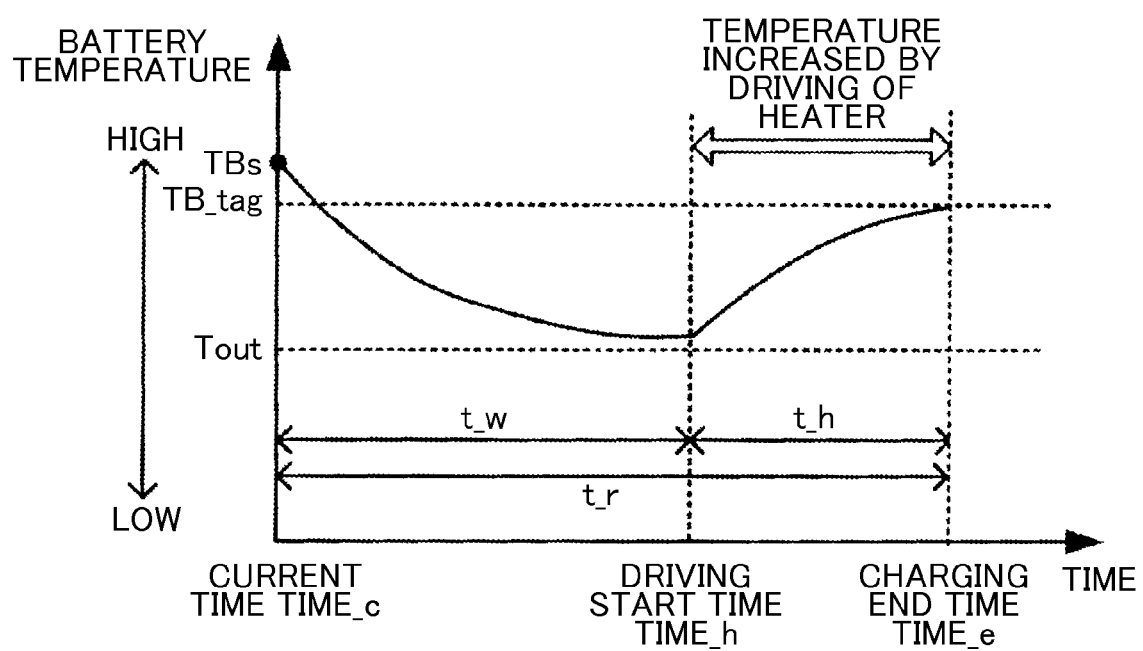
FIG. 7 shows a behavior (an example) of a battery temperature.

FIG. 7 shows a behavior (an example) of the battery temperature TBs. In FIG. 7, a vertical axis indicates the battery temperature TBs, and a horizontal axis indicates time.

The main battery 10 is charged or discharged while the vehicle runs. Accordingly, the battery temperature TBs becomes higher than the environmental temperature Tout. After the vehicle stops running and is left alone, the battery temperature TBs is decreased by the influence of the environmental temperature Tout. Here, if the vehicle continues to be left alone, the battery temperature TBs is decreased to the environmental temperature Tout. After the vehicle is left alone, the connector 43 is connected to the connector 42, and the charging end time TIME_e is set. In this way, the processing shown in FIG. 4 or FIG. 6 is started.

The current time TIME_c shown in FIG. 7 is the current time TIME_c that is obtained in the processing in step S304 shown in FIG. 4 or FIG. 6. According to the processing shown in FIG. 4 or FIG. 6, the battery temperature TBs and the environmental temperature Tout at the current time TIME_c shown in FIG. 7 are detected. In the example shown in FIG. 7, the battery temperature TBs at the current time TIME_c is higher than the target temperature TB_tag, and the environmental temperature Tout at the current time TIME_c is lower than the target temperature TB_tag. It should be noted that there is a case where the battery temperature TBs at the current time TIME_c is lower than the target temperature TB_tag. At the current time TIME_c, which is shown in FIG. 7, onward, the battery temperature TBs is decreased by the influence of the environmental temperature Tout.

According to the processing shown in FIG. 4, the temperature increasing time period t_h is identified, and the driving start time TIME_h is calculated at the current time TIME_c shown in FIG. 7. When the time elapses and the current time TIME_c passes the driving start time TIME_h, the heater 38 starts being driven. Meanwhile, according to the processing shown in FIG. 6, the temperature increasing time period t_h is identified, and the wait time period t_w is calculated at the current time TIME_c shown in FIG. 7. When the time elapses and the measured time period t_c becomes at least equal to the wait time period t_w, the heater 38 starts being driven.

It should be noted that the external charging is generally conducted when the SOC of the main battery 10 is lower than the reference value SOC_ref and the CS mode is set. Accordingly, the external charging time period t_chag tends to be longer than the temperature increasing time period t_h, and the charging start time TIME_chag tends to be time prior to the driving start time TIME_h.

Here, the battery temperature TBs at the driving start time TIME_h varies in accordance with the wait time period t_w shown in FIG. 7. Although the battery temperature TBs at the driving start time TIME_h is higher than the environmental temperature Tout in the example shown in FIG. 7, there is a case where the battery temperature TBs is decreased to the environmental temperature Tout.

Once the heater 38 starts being driven at the driving start time TIME_h, the battery temperature TBs is increased. According to the processing shown in FIG. 4 or FIG. 6, after the heater 38 starts being driven, the heater 38 is kept driven until the battery temperature TBs becomes at least equal to the target temperature TB_tag. Here, a time period in which the heater 38 is driven corresponds to the temperature increasing time period t_h. In addition, time at which the heater 38 stops being driven corresponds to the charging end time TIME_e. At the charging end time TIME_e, the battery temperature TBs can reach the target temperature TB_tag.

In the processing in step S306 shown in FIG. 4 or the processing in step S313 shown in FIG. 6, the behavior of the battery temperature TBs shown in FIG. 7 is estimated so as to identify the temperature increasing time period t_h. As the temperature increasing time period t_h extends, the battery temperature TBs tends to be increased by the driving of the heater 38. In addition, as the wait time period t_w extends, the battery temperature TBs tends to be decreased by the influence of the environmental temperature Tout. Here, a decreased amount of the battery temperature TBs depends on the battery temperature TBs and the environmental temperature Tout at the current time TIME_c shown in FIG. 7. The behavior of the battery temperature TBs can be understood by considering these points. As it has been described on the processing in step S306 shown in FIG. 4 and the processing in step S313 shown in FIG. 6, the temperature increasing time period t_h can be identified on the basis of the battery temperature TBs, the environmental temperature Tout, and the remaining time period t_r at the current time TIME_c.

The heater 38 is driven from the driving start time TIME_h to the charging end time TIME_e. The external charging is also conducted until the charging end time TIME_e. Thus, the time period in which the external charging is conducted overlaps the time period in which the heater 38 is driven. Here, the main battery 10 is energized while the external charging is conducted. However, the increase in the battery temperature TBs that is associated with energization of the main battery 10 is small in an environment in which the heater 38 is driven. Thus, in this embodiment, when the temperature increasing time period t_h is calculated, the increase in the battery temperature TBs that is associated with the energization of the main battery 10 is not taken into consideration.

In addition, in the case where the time period in which the external charging is conducted overlaps the time period in which the heater 38 is driven, some of the electric power from the charger 41 is supplied to the heater 38, and rest of the electric power from the charger 41 is supplied to the main battery 10.

Here, if the temperature increasing time period t_h varies, an amount of the electric power supplied to the heater 38 varies, and an amount of the electric power supplied to the main battery 10 also varies. When the amount of the electric power supplied to the main battery 10 varies, the external charging time period t_chag also varies. Accordingly, in the processing in step S101 shown in FIG. 2, the external charging time period t_chag can be calculated in consideration of the temperature increasing time period t_h. The temperature increasing time period t_h is calculated on the basis of the processing shown in FIG. 4 or FIG. 6. Thus, when the processing in step S101 shown in FIG. 2 is executed to calculate the external charging time period t_chag, the temperature increasing time period t_h can be taken into consideration.

For example, as it will be described below, the external charging time period t_chag during which the heater 38 is driven can be calculated.

First, as it has been described on the processing in step S101 shown in FIG. 2, the external charging time period t_chag in the case where the electric power from the charger 41 is only supplied to the main battery 10 is calculated. A deficient time period of the external charging time period t_chag, which will be described below, is added to this external charging time period t_chag. In this way, the external charging time period t_chag during which the heater 38 is driven can be calculated.

As described above, since some of the electric power from the charger 41 is supplied to the heater 38, the amount of the electric power supplied to the main battery 10 is decreased by the amount of the electric power supplied to the heater 38. Here, since the electric power that is used to drive the heater 38 is a fixed value, the amount of the electric power supplied to the heater 38 can be calculated on the basis of this electric power and the temperature increasing time period t_h (more specifically, the time period in which the heater 38 is driven).

In addition, it is possible to understand an increased amount of the SOC of the main battery 10 in the case where this amount of the electric power is supplied to the main battery 10. This increased amount of the SOC can be calculated from a full-charge capacity of the main battery 10 and the amount of the electric power that is supplied to the main battery 10. In the case where the heater 38 is driven, the charging of the main battery 10 becomes short by this increased amount of the SOC. Thus, the external charging only needs to be conducted to compensate for this deficient amount. The external charging time period t_chag that is provided to compensate for this deficient amount can be calculated on the basis of the above-described increased amount of the SOC and the electric power that is supplied to the main battery 10 from the charger 41.

According to this embodiment, the temperature increasing time period t_h is identified. Thus, the battery temperature TBs can reach the target temperature TB_tag at the charging end time TIME_e by driving the heater 38 only for a time period from the driving start time TIME_h to the charging end time TIME_e (that is, the temperature increasing time period t_h). Here, there is no need to drive the heater 38 in a time period prior to the driving start time TIME_h.

As described above, the vehicle starts running in the CD mode at the charging end time TIME_e onward. Once the vehicle starts running, the battery temperature TBs tends to be increased. Thus, it is possible to suppress a decrease in the battery temperature TBs after the heater 38 stops being driven. If the heater 38 stops being driven, and consequently, the battery temperature TBs is decreased, the electric power that is used to drive the heater 38 for increasing the battery temperature TBs is wasted. According to this embodiment, it is possible to suppress the decrease in the battery temperature TBs after the heater 38 stops being driven. Thus, it is also possible to suppress the electric power that is associated with the driving of the heater 38 from being wasted.

In addition, the battery temperature TBs has reached the target temperature TB_tag when the vehicle starts running. Thus, the input/output performance of the main battery 10 can be secured. As the battery temperature TBs is decreased, the input/output performance of the main battery 10 tends to be degraded. However, since the battery temperature TBs reaches the target temperature TB_tag, the degradation of the input/output performance of the main battery 10 can be suppressed. In the case where the input/output performance of the main battery 10 is secured when the vehicle starts running, charging or discharging of the main battery 10 is facilitated during the travel in the CD mode.

When the input/output performance of the main battery 10 is degraded during the travel in the CD mode, there is a case where the power requested for the vehicle is not satisfied only by the output of the main battery 10, for example. In this case, the engine 34 needs to be started in order to compensate for the deficient power. As a result, fuel economy is degraded. However, as in this embodiment, if the input/output performance of the main battery 10 is secured, the power requested for the vehicle is likely to be satisfied only by using the output of the main battery 10. Thus, the start of the engine 34 is suppressed, and the fuel economy can be improved.

Embodiment 2

A description will be made on Embodiment 2 of the invention. In this embodiment, the same components as those described in Embodiment 1 are denoted by the same reference numerals, and the detailed description thereof will not be made. Hereinafter, a description will mainly be made on points that differ from Embodiment 1.

In Embodiment 1, the environmental temperature Tout, which is detected by the temperature sensor 24, is used when the temperature increasing time period t_h is identified. However, in this embodiment, the environmental temperature Tout, which is detected by the temperature sensor 24, is not used when the temperature increasing time period t_h is identified. More specifically, in this embodiment, the environmental temperature Tout is preset, and the temperature increasing time period t_h is identified by using this set environmental temperature Tout. Information on the set environmental temperature Tout is stored in the memory 51. In this embodiment, in the control of the driving of the heater 38, the temperature sensor 24 is not used.

Figure 8:
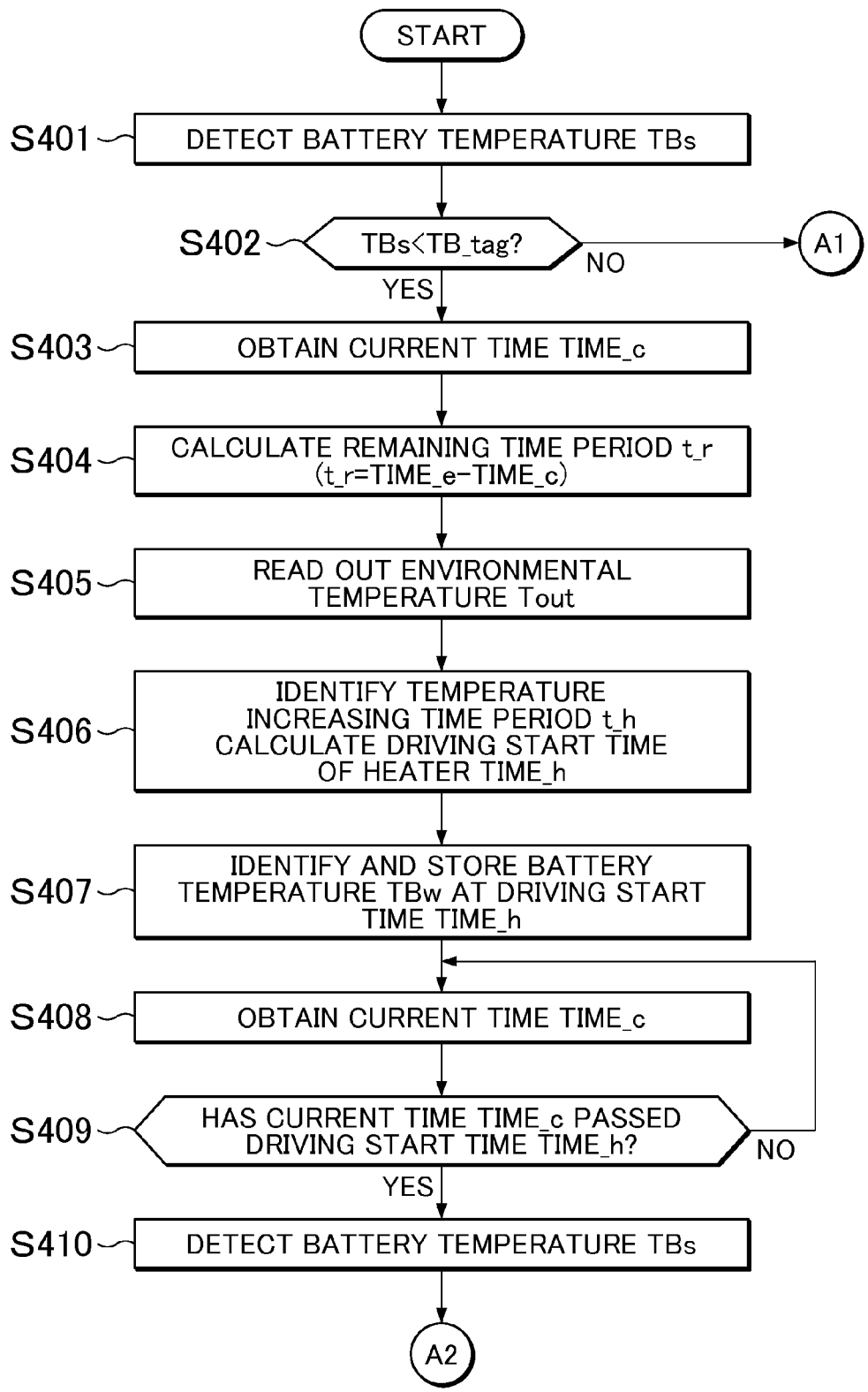
FIG. 8 is a flowchart of processing for controlling the driving of the heater in Embodiment 2.
Figure 9:
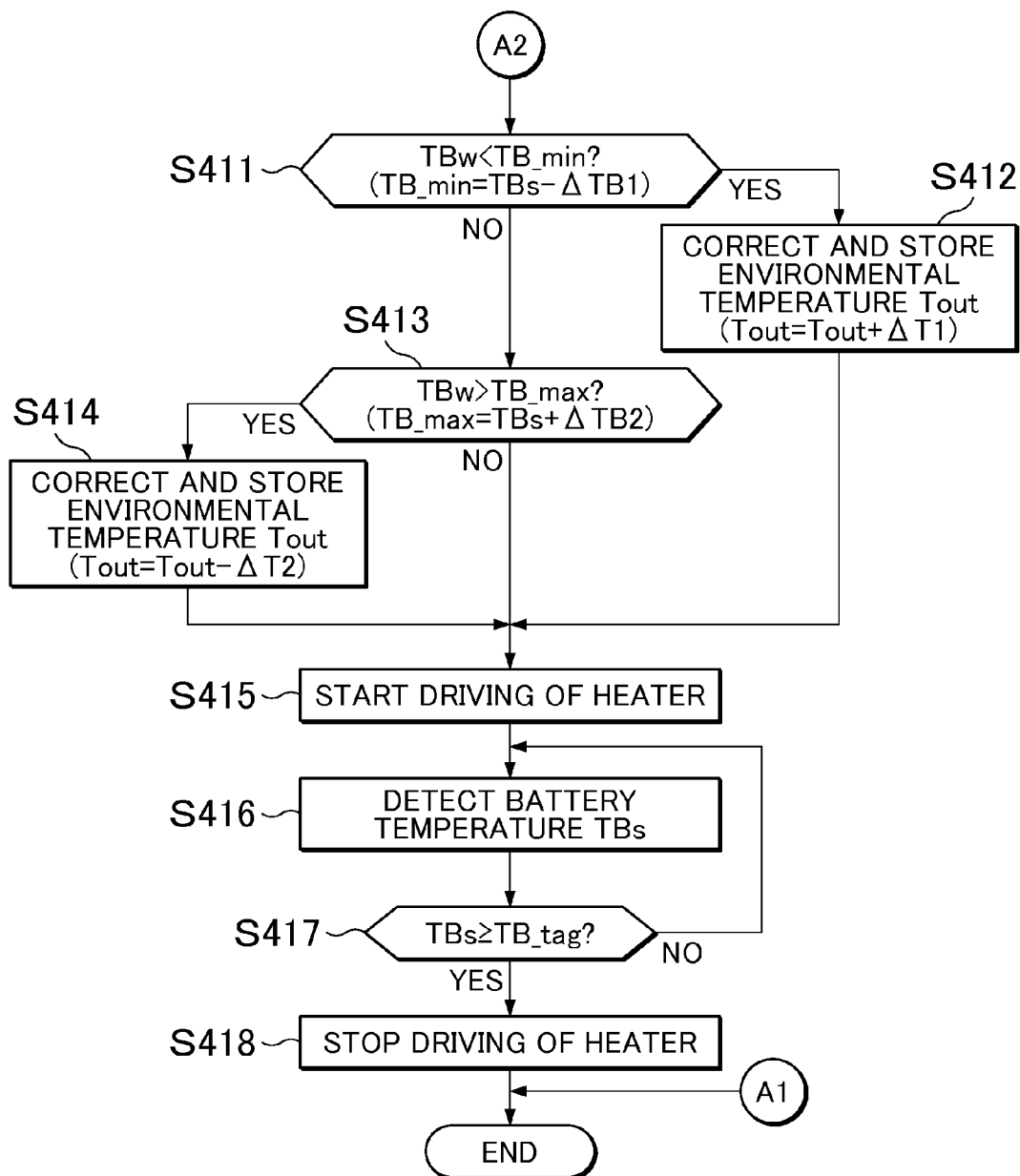
FIG. 9 is a flowchart of the processing for controlling the driving of the heater in Embodiment 2.

Driving control of the heater 38 in this embodiment will be described by using flowcharts shown in FIG. 8 and FIG. 9. The processing shown in FIG. 8 and FIG. 9 is executed by the controller 50. In addition, the processing shown in FIG. 8 and FIG. 9 is started when the connector 43 is connected to the connector 42 and the charging end time TIME_e is set in the setting section 25.

In step S401, the controller 50 uses the temperature sensor 23 to detect the battery temperature TBs. In step S402, it is determined whether the battery temperature TBs is lower than the target temperature TB_tag. Here, in the case where the plural temperature sensors 23 are provided, the battery temperatures TBs detected by the plural temperature sensors 23 may differ from each other in the processing in step S401. At this time, it can be determined in the processing in step S402 whether the lowest battery temperature TBs is lower than the target temperature TB_tag.

In step S402, if the battery temperature TBs is at least equal to the target temperature TB_tag, the controller 50 finishes the processing shown in FIG. 8 and FIG. 9. On the other hand, if the battery temperature TBs is lower than the target temperature TB_tag, the controller 50 proceeds with the processing to step S403.

The processing in steps S403 and S404 is the same as the processing in steps S304 and S305 shown in FIG. 4, respectively. In step S405, the controller 50 reads out the environmental temperature Tout that is stored in the memory 51.

As will be described below, when the environmental temperature Tout is corrected, the environmental temperature Tout after the correction is stored in the memory 51. Thus, in the processing in step S405, the environmental temperature Tout after the correction is read out from the memory 51. On the other hand, when the environmental temperature Tout is not corrected, an initial value of the environmental temperature Tout is stored in the memory 51. Thus, in the processing in step S405, the initial value of the environmental temperature Tout is read out from the memory 51. The initial value of the environmental temperature Tout is preset.

In step S406, the controller 50 identifies the temperature increasing time period t_h. The method for identifying the temperature increasing time period t_h is the same as the method described in Embodiment 1. However, in this embodiment, when the temperature increasing time period t_h is identified, the environmental temperature Tout read out from the memory 51 is used in the processing in step S405. In other words, the temperature increasing time period t_h is identified on the basis of the battery temperature TBs detected in the processing in step S401, the remaining time period t_r calculated in the processing in step S404, and the environmental temperature Tout read out in the processing in step S405.

In addition, in step S406, the controller 50 calculates the driving start time TIME_h on the basis of the temperature increasing time period t_h and the charging end time TIME_e. As it has been described on the processing in step S306 shown in FIG. 4, the driving start time TIME_h is the time prior to the charging end time TIME_e by the temperature increasing time period t_h.

In step S407, the controller 50 identifies (estimates) a battery temperature TBw at the driving start time TIME_h, that is, the battery temperature TBw at the time that the heater 38 starts being driven. In addition, in step S407, the controller 50 stores information on the identified battery temperature TBw in the memory 51.

The battery temperature TBw depends on the battery temperature TBs at the current time TIME_c, which is obtained in the processing in step S403, the environmental temperature Tout, and the wait time period t_w. Thus, a corresponding relationship among the battery temperature TBw, the battery temperature TBs at the current time TIME_c, the environmental temperature Tout, and the wait time period t_w can be calculated in advance. This corresponding relationship can be expressed by the calculating equation or the map, and information on this corresponding relationship can be stored in the memory 51.

As it has been described in Embodiment 1 (in processing in step S313 shown in FIG. 6), the wait time period t_w is the time period from the current time TIME_c, which is obtained in the processing in step S403, to the driving start time TIME_h. In other words, the wait time period t_w can be calculated by subtracting the temperature increasing time period t_h from the remaining time period t_r, which is calculated in the processing in step S404.

When the corresponding relationship among the battery temperatures TBw, TBs, the environmental temperature Tout, and the wait time period t_w is expressed by the calculating equation, the calculating equation shown by the following equation (2) can be used.

$$TBw=(TBs-Tout)e^{-c \cdot t\_w}+Tout \quad (2)$$

In the above equation (2), TBw is a battery temperature (an estimated value) at the driving start time TIME_h. TBs is a battery temperature at the current time TIME_c, and the battery temperature TBs detected in the processing in step S401 is used. Tout is an environmental temperature, and the environmental temperature Tout read out in the processing in step S405 is used. t_w is a wait time period, and, as described above, the wait time period t_w can be calculated by subtracting the temperature increasing time period t_h from the remaining time period t_r. c is a preset constant and is the same as the constant c, which has been described for the above equation (1). By using the above equation (2), the battery temperature TBw can be identified (calculated) on the basis of the battery temperature TBs at the current time TIME_c, the environmental temperature Tout, and the wait time period t_w.

Meanwhile, in the case where the above-described corresponding relationship is expressed by the map, the battery temperature TBw can be identified on the basis of the battery temperature TBs at the current time TIME_c, the environmental temperature Tout, and the wait time period t_w by using this map. For example, a map shown in FIG. 10 is prepared for the each environmental temperature Tout. The map shown in FIG. 10 indicates a corresponding relationship between the battery temperatures TBs, TBw and the wait time period t_w.

Since the map shown in FIG. 10 is prepared for the each environmental temperature Tout, the map shown in FIG. 10 that corresponds to the environmental temperature Tout read out in the processing in step S405 can be identified. Next, by using this identified map, the battery temperature TBw that corresponds to the battery temperature TBs detected in the processing in step S401 and the wait time period t_w that is calculated from the remaining time period t_r and the temperature increasing time period t_h can be identified.

Here, in the case where the plural temperature sensors 23 are provided, the battery temperatures TBs detected by the plural temperature sensors 23 may differ from each other in the processing in step S401. When the battery temperature TBw is identified by using the above-described calculating equation or map, the lowest battery temperature TBs can be used.

The processing in steps S408 and S409 is the same as the processing in steps S307 and S308 shown in FIG. 4, respectively. In step S409, the controller 50 determines whether the current time TIME_c, which is obtained in the processing in step S408, has passed the driving start time TIME_h, which is calculated in the processing in step S406. Here, the controller 50 returns the processing to step S408 when the current time TIME_c does not pass the driving start time TIME_h. On the other hand, when the current time TIME_c passes the driving start time TIME_h, the controller 50 proceeds with the processing to step S410.

It should be noted that, instead of the processing in steps S408 and S409, the processing in steps S314 and S315 shown in FIG. 6 can be executed. More specifically, after the processing in step S407 is executed, the measurement of the time period t_c by using the timer is started. Then, it is determined whether the measured time period t_c is at least equal to the wait time period t_w. If the measured time period t_c is at least equal to the wait time period t_w, the controller 50 can proceed with the processing to step S410. Here, the wait time period t_w is calculated in the processing in step S407. In addition, in this case, there is no need to calculate the driving start time TIME_h in the processing in step S406.

In step S410, the controller 50 detects the battery temperature TBs by using the temperature sensor 23. This battery temperature TBs is the battery temperature TBs at the driving start time TIME_h.

In step S411, the controller 50 determines whether the battery temperature TBw that is identified (estimated) in the processing in step S407 is lower than a lower limit temperature TB_min. The lower limit temperature TB_min is a temperature that is obtained by subtracting a permissible value (a positive value) ΔTB1 from the battery temperature TBs that is detected in the processing in step S410. The permissible value ΔTB1 can appropriately be set in consideration of a change in the battery temperature TBs that corresponds to a change in the environmental temperature Tout between day and night, and the like. Information on the permissible value ΔTB1 can be stored in the memory 51.

In the case where the battery temperature TBw is lower than the lower limit temperature TB_min, the battery temperature TBw is lower than the battery temperature TBs, and a difference between the battery temperatures TBw, TBs becomes larger than the permissible value ΔTB1. On the other hand, a case where the battery temperature TBw is at least equal to the lower limit temperature TB_min includes a case where the battery temperature TBw is at least equal to the battery temperature TBs and a case where the battery temperature TBw is lower than the battery temperature TBs and the difference between the battery temperatures TBw, TBs is at most equal to the permissible value ΔTB1.

In step S411, if the battery temperature TBw is lower than the lower limit temperature TB_min, the controller 50 corrects the environmental temperature Tout in step S412. More specifically, the controller 50 corrects the environmental temperature Tout by adding a correction value (a positive value) ΔT1 to the environmental temperature Tout that is currently set. In this way, the environmental temperature Tout after the correction becomes higher than the environmental temperature Tout before the correction.

The correction value ΔT1 can appropriately be set on the basis of the permissible value ΔTB1, and information on the correction value ΔT1 can be stored in the memory 51. In addition, in step S412, the controller 50 stores information on the environmental temperature Tout after the correction in the memory 51. Accordingly, when the processing shown in FIG. 8 and FIG. 9 is executed next time, the environmental temperature Tout after the correction is read out from the memory 51 in the processing in step S405.

As it can be understood from the above equation (2), when the battery temperature TBw is lower than the lower limit temperature TB_min, the environmental temperature Tout that is used for the identification of the battery temperature TBw is estimated to be lower than the actual environmental temperature Tout. For this reason, the environmental temperature Tout is increased by adding the correction value ΔT1 to the environmental temperature Tout as described above. In this way, the environmental temperature Tout that is used for the identification of the battery temperature TBw can approximate the actual environmental temperature Tout.

If the battery temperature TBw is at least equal to the lower limit temperature TB_min in step S411, the controller 50 determines whether the battery temperature TBw that is identified in the processing in step S407 is higher than an upper limit temperature TB_max in step S413. The upper limit temperature TB_max is a temperature that is obtained by adding a permissible value (a positive value) ΔTB2 to the battery temperature TBs that is detected in the processing in step S410. The permissible value ΔTB2 can appropriately be set in consideration of the change in the battery temperature TBs that corresponds to the change in the environmental temperature Tout between day and night, and the like. Information on the permissible value ΔTB2 can be stored in the memory 51. The permissible value ΔTB2 may be the same as the above-described permissible value ΔTB1 or may not be the same.

In the case where the battery temperature TBw is higher than the upper limit temperature TB_max, the battery temperature TBw is higher than the battery temperature TBs, and the difference between the battery temperatures TBw, TBs becomes larger than the permissible value ΔTB1. On the other hand, a case where the battery temperature TBw is at most equal to the upper limit temperature TB_max includes a case where the battery temperature TBw is at most equal to the battery temperature TBs and a case where the battery temperature TBw is higher than the battery temperature TBs and the difference between the battery temperatures TBw, TBs is at most equal to the permissible value ΔTB2.

In step S413, if the battery temperature TBw is higher than the upper limit temperature TB_max, the controller 50 corrects the environmental temperature Tout in step S414. More specifically, the controller 50 corrects the environmental temperature Tout by subtracting a correction value (a positive value) ΔT2 from the environmental temperature Tout that is currently set. In this way, the environmental temperature Tout after the correction becomes lower than the environmental temperature Tout before the correction.

The correction value ΔT2 can appropriately be set on the basis of the permissible value ΔTB2, and information on the correction value ΔT2 can be stored in the memory 51. The correction value ΔT2 may be the same as the above-described correction value ΔT1 or may not be the same. In addition, in step S414, the controller 50 stores information on the environmental temperature Tout after the correction in the memory 51. Accordingly, when the processing shown in FIG. 8 and FIG. 9 is executed next time, the environmental temperature Tout after the correction is read out from the memory 51 in the processing in step S405.

As it can be understood from the above equation (2), when the battery temperature TBw is higher than the upper limit temperature TB_max, the environmental temperature Tout that is used for the identification of the battery temperature TBw is estimated to be higher than the actual environmental temperature Tout. For this reason, the environmental temperature Tout is decreased by subtracting the correction value ΔT2 from the environmental temperature Tout as described above. In this way, the environmental temperature Tout that is used for the identification of the battery temperature TBw can approximate the actual environmental temperature Tout.

If the battery temperature TBw is at most equal to the upper limit temperature TB_max in step S413, the controller 50 starts driving the heater 38 in step S415. Also after executing the processing in steps S412 and S414, the controller 50 starts driving the heater 38 in step S415. Here, if the battery temperature TBw is at least equal to the lower limit temperature TB_min and is at most equal to the upper limit temperature TB_max, the environmental temperature Tout that is stored in the memory 51 is not corrected. The processing in step S415 to step S418 is the same as the processing in step S309 to step S312 shown in FIG. 4, respectively.

In the processing shown in FIG. 8 and FIG. 9, the heater 38 is driven if the battery temperature TBs is lower than the target temperature TB_tag. However, the invention is not limited thereto. More specifically, the heater 38 can also be driven if the environmental temperature Tout that is stored in the memory 51 is lower than the target temperature TB_tag. In other words, the processing in step S403 onward can be executed if at least one of the battery temperature TBs and the environmental temperature Tout is lower than the target temperature TB_tag. On the other hand, if both of the battery temperature TBs and the environmental temperature Tout are at least equal to the target temperature TB_tag, it is possible not to execute the processing in step S403 onward. In this case, the heater 38 is not driven.

Figure 11:
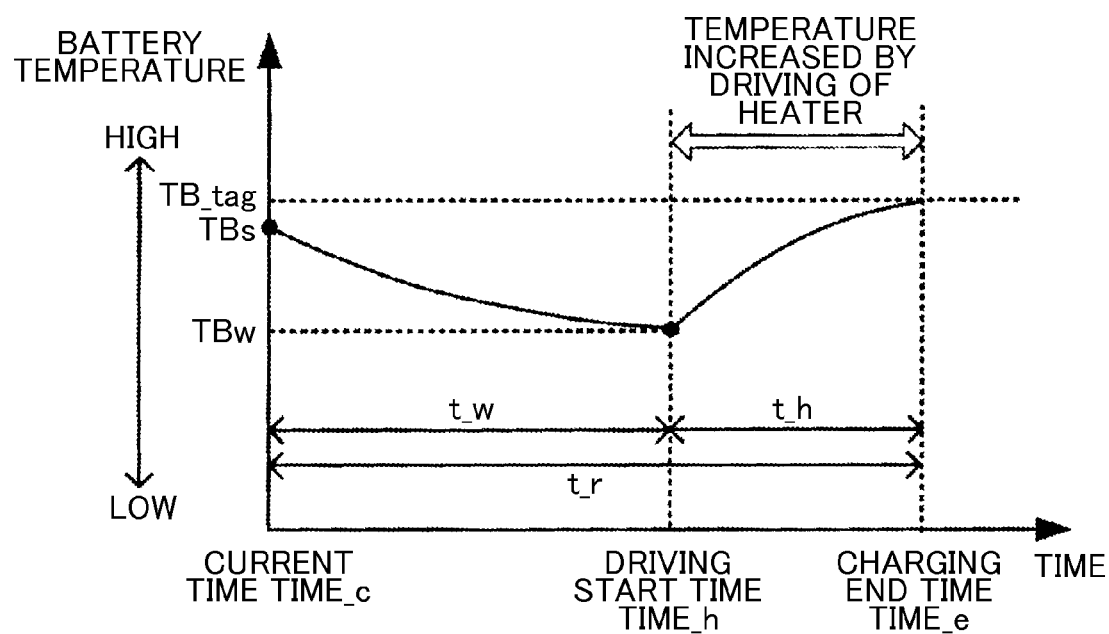
FIG. 11 shows the behavior of the battery temperature.

FIG. 11 shows a behavior (one example) of the battery temperature TBs. In FIG. 11, a vertical axis indicates the battery temperature TBs, and a horizontal axis indicates time.

The current time TIME_c shown in FIG. 11 is the current time TIME_c that is obtained in the processing in step S403 shown in FIG. 8. According to the processing shown in FIG. 8 and FIG. 9, the battery temperature TBs at the current time TIME_c shown in FIG. 11 is detected. In the example shown in FIG. 11, the battery temperature TBs at the current time TIME_c is lower than the target temperature TB_tag. At the current time TIME_c, which is shown in FIG. 11, onward, the battery temperature TBs is decreased by the influence of the environmental temperature Tout.

Meanwhile, according to the processing shown in FIG. 8 and FIG. 9, the temperature increasing time period t_h and the battery temperature TBw are identified, and the driving start time TIME_h is calculated at the current time TIME_c shown in FIG. 11. When the time elapses and the current time TIME_c passes the driving start time TIME_h, the heater 38 starts being driven.

In addition, when the current time TIME_c passes the driving start time TIME_h, the battery temperature TBs is detected by the temperature sensor 23, and the processing in steps S411 and S413 shown in FIG. 9 is executed. In other words, when the heater 38 starts being driven, the battery temperature TBs is detected by the temperature sensor 23, and the processing in steps S411 and S413 shown in FIG. 9 is executed. At this time, there is a case where the environmental temperature Tout is corrected by using the correction value ΔT1 or the correction value ΔT2. In the example shown in FIG. 11, the battery temperature TBw matches the battery temperature TBs that is detected by the temperature sensor 23 at the driving start time TIME_h. In this case, the environmental temperature Tout is not corrected.

When the heater 38 starts being driven at the driving start time TIME_h, the battery temperature TBs is increased. Also in this embodiment, similar to in Embodiment 1, the heater 38 starts being driven, and the heater 38 is kept driven until the battery temperature TBs becomes at least equal to the target temperature TB_tag. Here, the time period in which the heater 38 is driven becomes the temperature increasing time period t_h. In addition, time at which the heater 38 stops being driven becomes the charging end time TIME_e, and the battery temperature TBs can reach the target temperature TB_tag at the charging end time TIME_e.

According to this embodiment, the same effects as those in Embodiment 1 can be obtained. In addition, according to this embodiment, the temperature increasing time period t_h can be identified by not using the temperature sensor 24 but using the environmental temperature Tout stored in the memory 51. Here, the environmental temperature Tout stored in the memory 51 possibly deviates from the actual environmental temperature Tout. However, when the environmental temperature Tout is corrected, the environmental temperature Tout after the correction can approximate the actual environmental temperature Tout. In this way, the temperature increasing time period t_h that corresponds to the actual environmental temperature Tout tends to be identified.

What is claimed is:

1. A vehicle comprising:
an electric storage device configured to conduct external charging by using electric power from an external power source located outside of the vehicle, the electric storage device being a power source configured to make the vehicle run,
a first temperature sensor configured to detect a temperature of the electric storage device,
a second temperature sensor configured to detect an environmental temperature in a peripheral environment of the electric storage device,
a heater configured to warm the electric storage device by receiving the electric power from the external power source to generate heat, and
a controller configured to
(i) when end time of the external charging is set, calculate a remaining time period from current time at a time of this setting to the end time,
(ii) identify a temperature increasing time period that corresponds to the calculated remaining time period, the temperature of the electric storage device at the current time that is detected by the first temperature sensor, and the environmental temperature detected by the second temperature sensor, by using a specified corresponding relationship, the specified corresponding relationship being a corresponding relationship among the remaining time period, the temperature of the electric storage device at the current time, the environmental temperature, and the temperature increasing time period that is required for a temperature increase by driving the heater to increase the temperature of the electric storage device to a target temperature, and
(iii) start driving the heater based on the end time and the temperature increasing time period such that the temperature of the electric storage device at the end time reaches the target temperature.

2. A vehicle comprising:
an electric storage device configured to conduct external charging by using electric power from an external power source located outside of the vehicle, the electric storage device being a power source configured to make the vehicle run,
a temperature sensor configured to detect a temperature of the electric storage device,
a memory configured to store an environmental temperature in a peripheral environment of the electric storage device,
a heater configured to warm the electric storage device by receiving the electric power from the external power source and thereby generating heat, and
a controller configured to
(i) when end time of the external charging is set, calculate a remaining time period from current time at a time of this setting to the end time,
(ii) identify a temperature increasing time period that corresponds to the calculated remaining time period, the temperature of the electric storage device at the current time that is detected by the temperature sensor, and the environmental temperature stored in the memory by using a specified corresponding relationship, the specified corresponding relationship being a corresponding relationship among the remaining time period, the temperature of the electric storage device at the current time, the environmental temperature, and the temperature increasing time period that is required for a temperature increase by driving the heater to increase the temperature of the electric storage device to a target temperature, and (iii) start driving the heater based on the end time and the temperature increasing time period such that the temperature of the electric storage device at the end time reaches the target temperature.

3. The vehicle according to claim 2 wherein
the controller is configured to
identify the temperature of the electric storage device at a time that the heater starts being driven that corresponds to the temperature of the electric storage device at the current time detected by the temperature sensor, the environmental temperature stored in the memory, and a wait time period calculated from the remaining time period and the temperature increasing time period by using a specified corresponding relationship, the specified corresponding relationship being a corresponding relationship among the temperature of the electric storage device at the current time, the temperature of the electric storage device at the time that the heater starts being driven, the environmental temperature, and the wait time period from the current time to the time at which the heater starts being driven, detect the temperature of the electric storage device by the temperature sensor when the heater starts being driven, and increase the environmental temperature that is stored in the memory by a specified temperature when the identified temperature of the electric storage device is lower than the detected temperature of the electric storage device and a difference between the identified temperature and the detected temperature is larger than a permissible value.

4. The vehicle according to claim 2 wherein
the controller is configured to
identify the temperature of the electric storage device at the time that the heater starts being driven that corresponds to the temperature of the electric storage device at the current time detected by the temperature sensor, the environmental temperature stored in the memory, and the wait time period calculated from the remaining time period and the temperature increasing time period by using a specified corresponding relationship, the specified corresponding relationship being a corresponding relationship among the temperature of the electric storage device at the current time, the temperature of the electric storage device at the time that the heater starts being driven, the environmental temperature, and the wait time period from the current time to the time at which the heater starts being driven, detect the temperature of the electric storage device by the temperature sensor when the heater starts being driven, and decrease the environmental temperature that is stored in the memory by a specified temperature when the identified temperature of the electric storage device is higher than the detected temperature of the electric storage device and a difference between the identified temperature and the detected temperature is larger than a permissible value.

5. The vehicle according to claim 1 further comprising:
an engine that is a power source configured to make the vehicle run, wherein
the vehicle is configured to run in a charge depleting mode when a state of charge of the electric storage device is equal to or higher than a reference value, and run in a charge sustaining mode when the state of charge is lower than the reference value,
the state of charge at a time that the external charging is finished is equal to or higher than the reference value, and
the target temperature is a temperature of the electric storage device at which output of the electric storage device corresponding to a travel in the charge depleting mode is secured.

6. The vehicle according to claim 5 wherein
the state of charge represents a charging and discharging rate of the electric storage device,
the charge depleting mode is a mode in which the travel only by using the output of the electric storage device is prioritized, and
the charge sustaining mode is a mode in which the travel by concurrently using the output of the electric storage device and the output of the engine is prioritized.

* * * * *